No. 760,754. PATENTED MAY 24, 1904.
G. H. POOR.
SECTIONAL SHELL.
APPLICATION FILED FEB. 20, 1904.
NO MODEL. 2 SHEETS—SHEET 1.
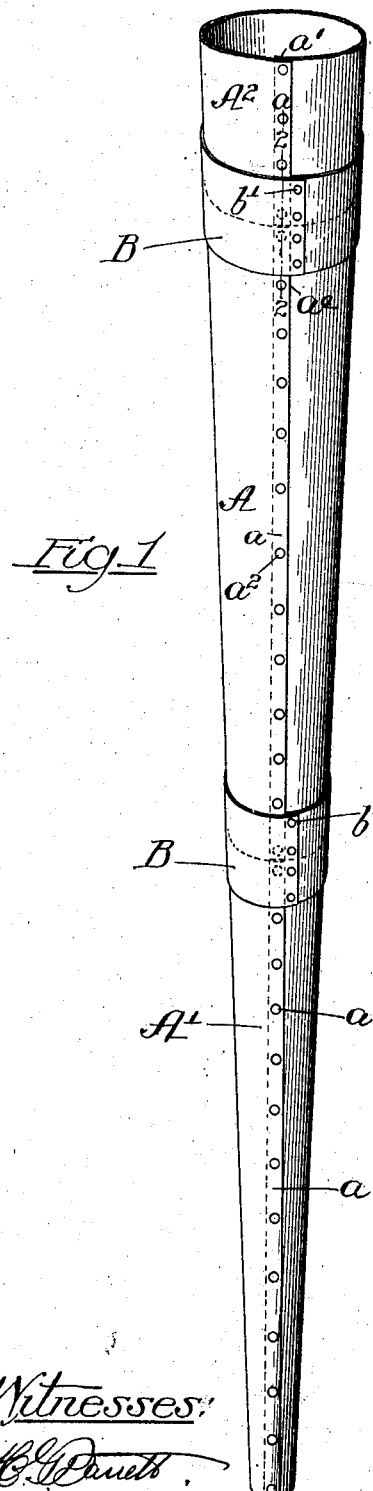
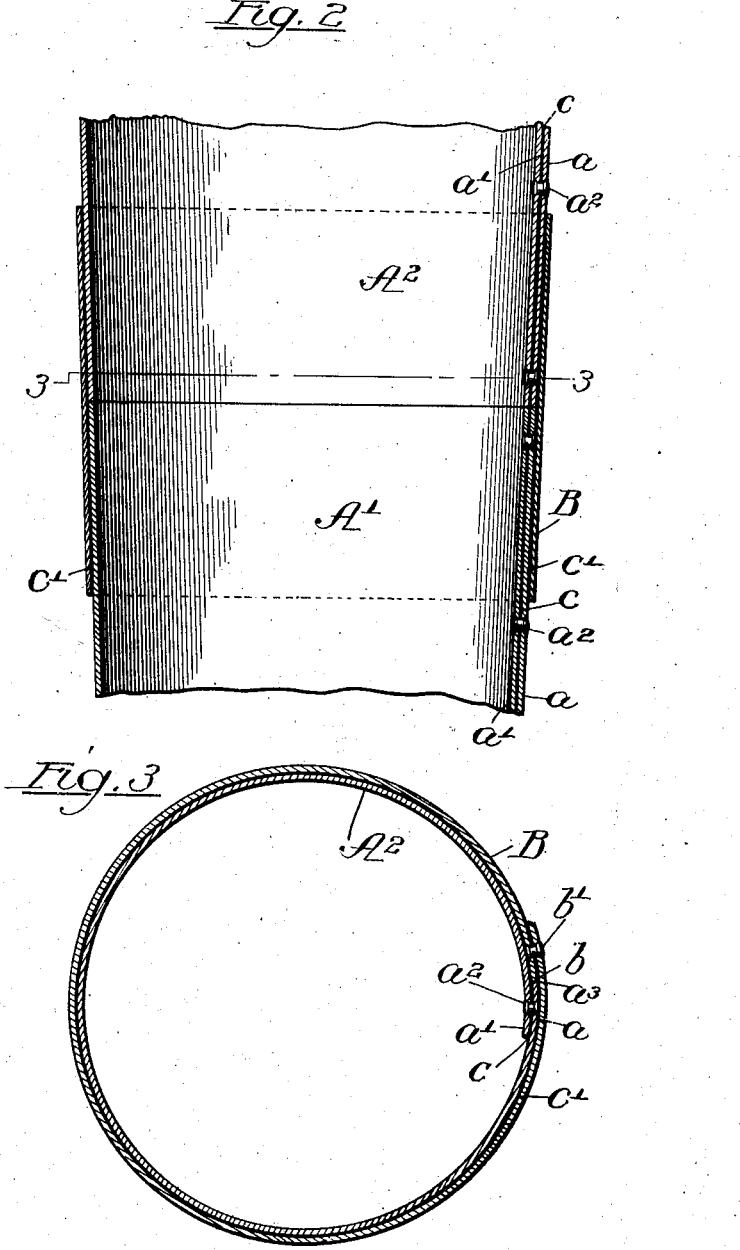
Witnesses:
Inventor:
George H. Poor
by Poole & Brown his Attys No. 760,754. PATENTED MAY 24, 1904.
G. H. POOR.
SECTIONAL SHELL.
APPLICATION FILED FEB. 20, 1904.
NO MODEL. 2 SHEETS—SHEET 2.
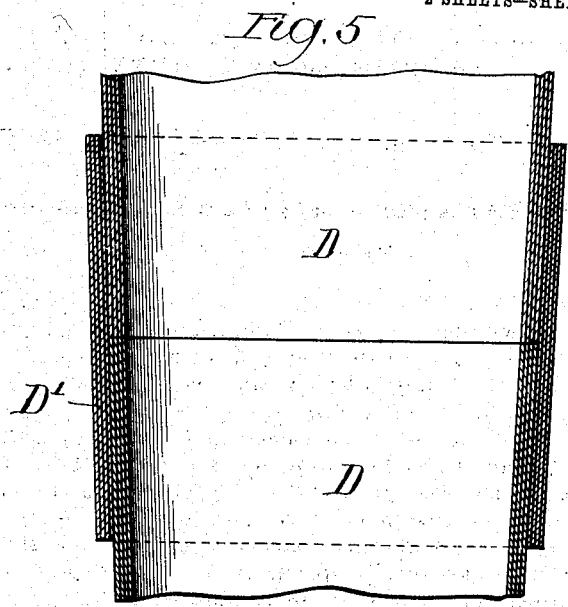
Fig. 5
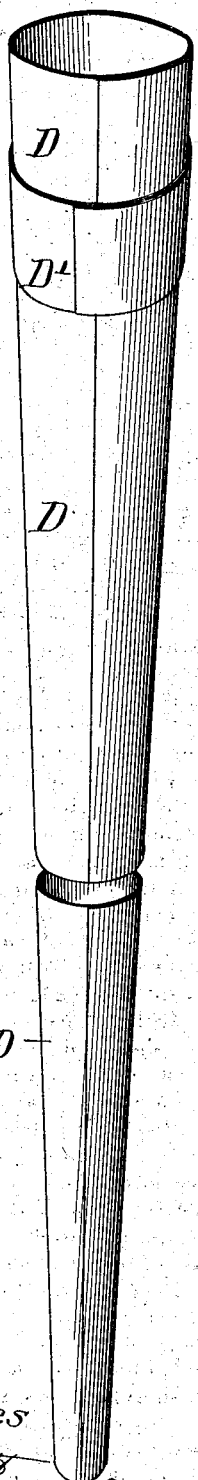
Fig. 4
Fig. 6
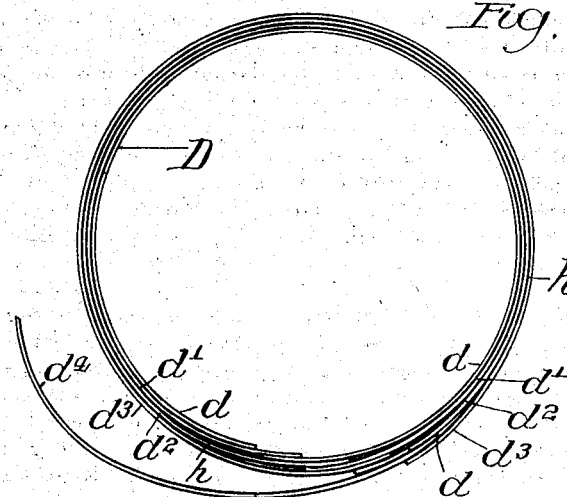
Fig. 7
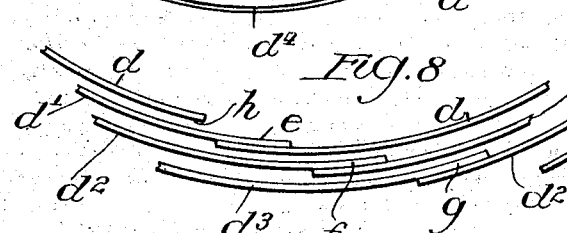
Fig. 8
Witnesses
Inventor
George H. Poor
By Poole & Brown Attys No. 760,754. Patented May 24, 1904.

UNITED STATES PATENT OFFICE.

GEORGE H. POOR, OF CHICAGO, ILLINOIS, ASSIGNOR TO SAMUEL WORTHINGTON McMUNN, OF CHICAGO, ILLINOIS.

SECTIONAL SHELL.

SPECIFICATION forming part of Letters Patent No. 760,754, dated May 24, 1904.

Application filed February 20, 1904. Serial No. 194,534. (No model.)

*To all whom it may concern:*

Be it known that I, GEORGE H. POOR, a citizen of the United States, and a resident of Chicago, in the county of Cook and State of Illinois, have invented certain new and useful Improvements in Sectional Shells; and I do hereby declare that the following is a full, clear, and exact description thereof, reference being had to the accompanying drawings, and to the letters of reference marked thereon, which form a part of this specification.

This invention relates to shells adapted to be applied to pile work being driven into the ground or through water, sand, or other soft material and subsequently being filled with a concrete material, the shell being ordinarily driven into position by means of a collapsible core. Heretofore such shells have been made of such length as were needed for the given pile—that is to say, if it was desired to make a pile thirty feet long the shell would be one continuous structure thirty feet in length.

The first and primary object of my invention is to make a sectional shell—that is to say, a shell for any given length of pile—which shall be in parts or sections.

Another object of my invention is to make such shell-sections telescopic, primarily for more convenience in packing and shipping.

Yet another object of my invention is to so construct the different sections of the shell that when placed in juxtaposition to form a complete shell the adjacent section ends shall abut each other, the abutting adjacent ends of the shell-sections being suitably bound together by means of a collar.

Another object of my invention is to make such sectional shells waterproof by treating them to a suitable waterproofing material or by securing the joints together by means of waterproof cement or the like.

Another object of my invention is to cheapen the cost of manufacture of paper shells for concrete piles.

These and other objects of the invention will be more fully understood by reference to the accompanying drawings.

In said drawings Figure 1 is a perspective view of a shell for pile work embodying my invention. Fig. 2 is a vertical sectional view, enlarged, of two abutting sections of the shell and taken through the surrounding collar upon line 2 2 of Fig. 1. Fig. 3 is a transverse or horizontal sectional view, also enlarged, taken upon the line 3 3 of Fig. 2. Fig. 4 is a perspective view of sections of a shell, showing a modified form. Fig. 5 is a vertical sectional view, enlarged, of such modification, showing also the surrounding collar. Fig. 6 is a perspective view of one of the collars. Fig. 7 is a horizontal plan view, enlarged, showing the method of forming one of the sections. Fig. 8 is a diagrammatic view, further enlarged, showing the lap-joints of the sheets forming the shell illustrated in Fig. 7.

In making the sectional shell I may use metal, paper, cardboard, or other sheet material. Wherever the material used is of sufficient rigidity for the purpose, I prefer to cut the section-blank to proper shape, turn the sheet of material into a tapered tubular form over a mandrel, lap the adjacent side margins, and rivet the lapped margins by suitable means, using, preferably, a waterproof cement between the lapped portions before riveting, as shown in Fig. 1. Where the shell is made entirely of paper, I prefer to make the separate sheets of such shape that when rolled over a mandrel the shell when completed will have the tapered form, as shown in Fig. 4, suitably securing the several sheets together by a waterproof cement and having the ends overlap. This latter form of shell-section constitutes the modification illustrated in Figs. 4 to 8, inclusive.

Referring first to the shell shown in Figs. 1, 2, and 3, A represents one shell-section, and A' another shell-section. A portion of a third shell-section is shown at $A^2$, and the collar securing the adjoining sections together is shown at B. The shell-sections are each made of a single piece of cardboard, sheet metal, or the like wrapped over a mandrel so that its adjacent side margins $a\ a'$ overlap each other, as shown in Figs. 1 and 3. These overlapping ends or sides are suitably secured together by means of a plurality of rivets $a^2\ a^2$. The collar B is made in a similar fashion, but of such diameter interiorly as to properly fit snugly over the two adjacent ends of adjoining shell-sections, as clearly shown in Figs. 1, 2, and 3. It will be seen by reference to Fig. 3 that the inner edge of the side margin of the collar B forms a shoulder at $b$, which rests against corresponding shoulders $a^3$ $a^4$ on the adjacent shell-sections. The heavy black line between the overlapped margins in the shell-section and in the collar-section indicates a suitable cement or binding material $c$. Such cement or binding material $c$ may also be employed between the adjacent end sections and the said collar, as indicated in Fig. 3. Rivets $b'$ are preferably used to secure the overlapping ends of the collar B, as shown. This form of shell makes an exceedingly simple, durable, cheap, and convenient shell-section.

Referring now more particularly to Figs. 4 to 8, inclusive, the letters D D designate shell-sections. In Fig. 4 I have shown two sections and the lower end of a third section of paper shell embracing the modified form before referred to. Each section is composed of a plurality of sheets of paper $d$ $d'$ $d^2$ $d^3$, wrapped about a mandrel and suitably cemented together. In this drawing I have shown simply for convenience each section (and also the binding-ring) as being composed of but four of such sheets of paper; but obviously any number of sheets of paper may be used for the purpose. $D'$ is the collar. Referring more particularly to Figs. 7 and 8, it will be noticed that the first or innermost sheet (lettered $d$) is of such size as to just go about a suitable mandrel. The adjacent side margins of the sheet do not overlap each other and would abut each other but for the next adjacent sheet $d'$ being interposed between the said two side margins or edges—that is to say, the next sheet $d'$ is positioned upon the mandrel at such a point that its inner side margin $e$ is interposed between the two adjacent edges or margins of the sheet $d$, and the sheet $d'$ is then wrapped about the exterior of the sheet $d$. Before the outer or free side margin is secured in position the third sheet $d^2$ is positioned, its inner side margin $f$ being similarly placed between the two adjacent edges of the sheet $d'$. Similarly the inner margin $g$ of the sheet $d^3$ is interposed between the two margins of the sheet $d^2$ and the sheet is then wrapped about the mandrel, and so on, the point where the next sheet is laid on shifting radially each time until the section is completed. In other words, each sheet is laid upon the preceding sheet after the first sheet has been wrapped about the mandrel in such shape as to have its edge overlap the last edge of the preceding sheet. In this way sheet after sheet is applied, the overlapping edges being thus constantly shifted radially, as shown, a suitable waterproofing or cementing material (indicated in the drawings by the black lines at $h$) being interposed between the several sheets. In this way the sheet-section is built up. This method of forming a sheet-section I make no specific claim for in this application, reserving the right to claim the same in another and separate application. The built-up sections are constructed by means of suitable machinery designed for that purpose, which is also the subject of a separate application and for which I make no claim in this application.

In practice the several shell-sections will probably not be over ten or twelve feet in length, and the collar surrounding the adjacent or abutting ends of such shell-sections will be approximately twelve inches in length; but the length of the sections and shells may vary to suit the needs of any particular piece of work.

What I claim, and desire to secure by Letters Patent, is as follows:

1. A shell for pilework consisting of a plurality of tapered sections placed end to end, their abutting ends covered by a suitable collar or band.

2. A shell for concrete pilework consisting of a plurality of tapered sections placed end to end, their abutting ends covered by a suitable collar or band of the same material.

3. A shell for concrete piles consisting of a plurality of tapered sections, each section being composed of a single piece of material lap-jointed and riveted, 4. A shell for concrete piles consisting of a plurality of tapered sections, each section being composed of a single piece of material lap-jointed and riveted, the ends of the several sections abutting each other and suitably secured together by a collar or band.

In testimony that I claim the foregoing as my invention I affix my signature, in presence of two witnesses, this 17th day of February, A. D. 1904.

GEORGE H. POOR.

Witnesses:
TAYLOR E. BROWN,
C. CLARENCE POOLE.